US009794779B2

(12) United States Patent
Li

(10) Patent No.: US 9,794,779 B2
(45) Date of Patent: Oct. 17, 2017

(54) METHOD FOR SENDING AND RECEIVING BUFFER STATUS REPORT, USER EQUIPMENT, AND BASE STATION

(71) Applicant: Huawei Technologies Co., Ltd., Shenzhen (CN)

(72) Inventor: Yajuan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 14/695,862

(22) Filed: Apr. 24, 2015

(65) Prior Publication Data
US 2015/0230082 A1    Aug. 13, 2015

Related U.S. Application Data

(63) Continuation of application No. PCT/CN2013/084897, filed on Oct. 9, 2013.

(30) Foreign Application Priority Data

Oct. 25, 2012 (CN) .......................... 2012 1 0412885

(51) Int. Cl.
H04W 8/24 (2009.01)
H04W 28/02 (2009.01)
(Continued)

(52) U.S. Cl.
CPC ............. *H04W 8/24* (2013.01); *H04W 24/08* (2013.01); *H04W 28/0252* (2013.01);
(Continued)

(58) Field of Classification Search
CPC ... H04W 8/24; H04W 24/08; H04W 28/0252; H04W 28/0278; H04W 72/1284; H04W 24/10
See application file for complete search history.

(56) References Cited

U.S. PATENT DOCUMENTS

2010/0098011 A1   4/2010   Pelletier et al.
2012/0082152 A1   4/2012   Baldemair et al.
(Continued)

FOREIGN PATENT DOCUMENTS

CN    102291760 A    12/2011
CN    102638840 A    8/2012
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)," 3GPP TS 36. 321, V11.0.0, XP55387914A, pp. 1-56, 3rd Generation Partnership Project, Valbonne, France (Sep. 2012).

*Primary Examiner* — Curtis A Alia
(74) *Attorney, Agent, or Firm* — Leydig, Voit & Mayer, Ltd.

(57) ABSTRACT

Embodiments of the present invention provide a method for sending and receiving a buffer status report, a user equipment, and a base station. The method includes: receiving indication information that is sent by a macro base station and that is used to request a user equipment UE to send a buffer status report, and sending a buffer status report BSR to the macro base station and/or at least one small cell according to the indication information, where the macro base station and the at least one small cell jointly serve the UE, and a service area of the macro base station is larger than a service area of each small cell of the at least one small cell.

16 Claims, 4 Drawing Sheets

(51) Int. Cl.
*H04W 24/08* (2009.01)
*H04W 72/12* (2009.01)
*H04W 24/10* (2009.01)

(52) U.S. Cl.
CPC ... *H04W 28/0278* (2013.01); *H04W 72/1284* (2013.01); *H04W 24/10* (2013.01)

(56) References Cited

U.S. PATENT DOCUMENTS

| | | | |
|---|---|---|---|
| 2012/0099452 A1* | 4/2012 | Dai | H04W 72/1221 370/252 |
| 2012/0140743 A1 | 6/2012 | Pelletier et al. | |
| 2012/0188952 A1 | 7/2012 | Baldemair et al. | |
| 2015/0009923 A1* | 1/2015 | Lei | H04W 72/0413 370/329 |

FOREIGN PATENT DOCUMENTS

| | | | | |
|---|---|---|---|---|
| EP | 2858441 A1 | 4/2015 | | |
| WO | WO 2012034799 A1 | 3/2012 | | |
| WO | WO2013116988 A1 * | 8/2013 | | H04W 72/0413 |

\* cited by examiner

| Receive indication information that is sent by a macro base station and that is used to request a user equipment UE to send a buffer status report | 101 |

| Send a buffer status report BSR to the macro base station and/or at least one small cell according to the indication information | 102 |

METHOD FOR SENDING AND RECEIVING BUFFER STATUS REPORT, USER EQUIPMENT, AND BASE STATION

CROSS-REFERENCE TO RELATED APPLICATIONS

This application is a continuation of International Patent Application No. PCT/CN2013/084897, filed on Oct. 9, 2013, which claims priority to Chinese Patent Application No. 201210412885.7, filed on Oct. 25, 2012, both of which are hereby incorporated by reference in their entireties.

TECHNICAL FIELD

Embodiments of the present invention relate to the field of communications technologies, and in particular, to a method for sending and receiving a buffer status report, a user equipment, and a base station.

BACKGROUND

As mobile communications technologies develop and a quantity of people who use mobile data services increases, load of an existing macro cell is increasingly heavy. In order to provide better services for users, a carrier aggregation (Carrier Aggregation, CA for short) technology is introduced in the 3rd Generation Partnership Project (the 3rd Generation Partnership Project, 3GPP for short).

In the CA technology, multiple base stations may be used to provide a service for a same UE. For example, a small cell and a macro base station may be used to provide a service for a UE in a cooperative manner. The small cell may be, for example, a home eNodeB (HeNB for short), a pico base station (pico for short), or a radio remote head (RRH for short). A coverage area and transmit power of the small cell are relatively small, and a coverage area of the macro base station is wide and transmit power of the macro base station is relatively large. In terms of functions, the macro base station can provide wide coverage and is responsible for controlling signaling, and the small cell can enhance user data and is responsible for all or some user service data.

However, in a scenario in which the small cell and the macro base station jointly bear transmission of a same data service of a user, a user equipment (UE for short) needs to send uplink data to the small cell and the macro base station separately. In the prior art, the small cell and the macro base station cannot accurately learn a buffer status report (hereinafter referred to as BSR) reported by the UE. Because data of the UE is sent to the small cell and the macro base station separately, and BSRs of all data in a buffer of the UE cannot be applied to a scenario in which multiple base stations serve the UE. As a result, the small cell and the macro base station cannot perform scheduling in a timely manner.

SUMMARY

Embodiments of the present invention provide a method for sending and receiving a buffer status report, a user equipment, and a base station, so that a small cell and a macro base station can accurately learn buffer status reports reported by a UE in a scenario in which the small cell and the macro base station jointly bear transmission of a same data service of a user, and therefore the small cell and the macro base station can perform scheduling in a timely manner.

A first aspect of the embodiments of the present invention provides a method for sending a buffer status report, including:

receiving indication information that is sent by a macro base station and that is used to request a user equipment UE to send a buffer status report; and sending a buffer status report BSR to the macro base station and/or at least one small cell according to the indication information, where the macro base station and the at least one small cell jointly serve the UE, and a service area of the macro base station is larger than a service area of each small cell of the at least one small cell.

In a first possible implementation manner of the first aspect, the indication information includes information that indicates a size of data separately transmitted to the macro base station and the at least one small cell in each service.

With reference to the first possible implementation manner of the first aspect, in a second possible implementation manner of the first aspect, the indication information further includes:

information that is sent by the macro base station and that is used to indicate a receiving base station of the BSR, where the receiving base station of the BSR includes the macro base station and/or the at least one small cell.

In a third possible implementation manner of the first aspect, after the receiving indication information sent by a macro base station, the method further includes:

receiving update information that is sent by the macro base station or the small cell and that is used for substituting for a receiving base station of the BSR, where a substitute receiving base station includes a macro base station and/or at least one small cell.

With reference to the first aspect or with reference to the first possible implementation manner of the first aspect, the second possible implementation manner of the first aspect, or the third possible implementation manner of the first aspect, in a fourth possible implementation manner of the first aspect, the indication information or the update information includes:

Radio Resource Control signaling RRC signaling, a broadcast message, Media Access Control layer MAC control signaling, or physical layer control signaling.

With reference to the first aspect or with reference to the first possible implementation manner of the first aspect, the second possible implementation manner of the first aspect, the third possible implementation manner of the first aspect, or the fourth possible implementation manner of the first aspect, in a fifth possible implementation manner of the first aspect, the receiving indication information sent by a macro base station includes:

receiving traffic distribution ratio information, sent by the macro base station, of each service, where the traffic distribution ratio information is used to indicate the size of data that is separately transmitted to the macro base station and the at least one small cell; and the sending a buffer status report to the macro base station and/or at least one small cell according to the indication information includes:

determining, according to the traffic distribution ratio information of each service, a first data buffer size of each logical channel group corresponding to the macro base station and/or a data buffer size of each logical channel group corresponding to the at least one small cell; and sending, to the macro base station, a BSR corresponding to the first data buffer size and/or sending, to the at least one small cell, a BSR corresponding to the data buffer size of each logical channel group corresponding to the small cell; or, sending, to the macro base station, a BSR corresponding to the first data buffer size and/or a BSR corresponding to the data buffer size of each logical channel group of the at least one small cell; or, sending, to the at least one small cell, a BSR corresponding to the first data buffer size and/or a BSR corresponding to the data buffer size of each logical channel group of the at least one small cell.

With reference to the fifth possible implementation manner of the first aspect, the determining, according to the traffic distribution ratio information, a first data buffer size of each logical channel group corresponding to the macro base station and/or a data buffer size of each logical channel group corresponding to the at least one small cell includes:

obtaining the first data buffer size through calculation by using $$\sum_{i=0}^{N} Bi*Mi,$$

and obtaining the data buffer size of each logical channel group corresponding to the at least one small cell through calculation by using $$\sum_{i=0}^{N} Bi*Si,$$

where

Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service.

With reference to the first aspect or with reference to the first possible implementation manner of the first aspect, the second possible implementation manner of the first aspect, the third possible implementation manner of the first aspect, or the fourth possible implementation manner of the first aspect, in a sixth possible implementation manner of the first aspect, the receiving indication information sent by a macro base station includes:

receiving parameter information, sent by the macro base station, about a logical channel priority corresponding to each service, where the parameter information about the logical channel priority is used to indicate the size of data that is separately transmitted to the macro base station and the at least one small cell; and the sending a buffer status report to the macro base station and/or at least one small cell according to the indication information includes:

determining a traffic distribution ratio according to the parameter information about the logical channel priority, and determining, according to the traffic distribution ratio, a first data buffer size of each logical channel group corresponding to the macro base station and/or a data buffer size of each logical channel group corresponding to the at least one small cell; and sending, to the macro base station, a BSR corresponding to the first data buffer size and/or sending, to the at least one small cell, a BSR corresponding to the data buffer size of each logical channel group corresponding to the small cell; or, sending, to the macro base station, a BSR corresponding to the first data buffer size of each logical channel group corresponding to the macro base station and/or a BSR corresponding to the data buffer size of each logical channel group of the at least one small cell; or, sending, to the at least one small cell, a BSR corresponding to the first data buffer size and/or a BSR corresponding to the data buffer size of each logical channel group of the at least one small cell.

With reference to the sixth possible implementation manner of the first aspect, the determining a traffic distribution ratio according to the parameter information about the logical channel priority, and determining, according to the traffic distribution ratio, a first data buffer size of each logical channel group corresponding to the macro base station and a data buffer size of each logical channel group corresponding to the at least one small cell includes:

obtaining the first data buffer size through calculation by using $$\sum_{i=0}^{N} Bi*\frac{PBRmi*BSDmi}{PBRmi*BSDmi+PBRsi*BSDsi},$$

and obtaining the data buffer size of each logical channel group corresponding to the at least one small cell through calculation by using $$\sum_{i=0}^{N} Bi*\frac{PBRsi*BSDsi}{PBRmi*BSDmi+PBRsi*BSDsi},$$

where

PBRmi and BSDmi are, respectively, a prioritized bit rate and a bucket size duration, in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, N is a quantity of services in the logical channel group LCG, and Bi is a current data buffer size corresponding to each service.

With reference to the first aspect or with reference to the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, the BSR further includes:

an LCID or a base station index, where the LCID is used to identify a BSR that needs to be forwarded, and the base station index is used to identify a destination base station to which a BSR needs to be forwarded.

A second aspect of the embodiments of the present invention provides a method for receiving a buffer status report, including:

sending, by a macro base station to a user equipment UE, indication information that is used to request the UE to send a buffer status report; and receiving, by the macro base station, a buffer status report BSR that is sent by the UE according to the indication information, where the macro base station and at least one small cell jointly serve the UE, and a service area of the macro base station is larger than a service area of each small cell of the at least one small cell.

In a first implementation manner of the second aspect, the indication information includes information that indicates a size of data separately transmitted to the macro base station and the at least one small cell in each service.

With reference to the first implementation manner of the second aspect, in a second implementation manner of the second aspect, the indication information further includes:

information that indicates a receiving base station of the BSR, where the receiving base station of the BSR includes the macro base station and/or the at least one small cell.

In a third implementation manner of the second aspect, after the sending indication information to a UE, the method further includes:

sending, to the UE, update information that is used for substituting for a receiving base station of the BSR, where a substitute receiving base station includes a macro base station and/or at least one small cell.

With reference to the second aspect, the first implementation manner of the second aspect, the second implementation manner of the second aspect, or the third implementation manner of the second aspect, in a fourth implementation manner of the second aspect, the indication information or the update information includes:

RRC signaling, a broadcast message, MAC control signaling, or physical layer control signaling.

With reference to the second aspect, the first implementation manner of the second aspect, the second implementation manner of the second aspect, the third implementation manner of the second aspect, or the fourth implementation manner of the second aspect, in a fifth implementation manner of the second aspect, the sending indication information to a UE includes:

sending traffic distribution ratio information corresponding to each service to the UE, where the traffic distribution ratio information is used to indicate the size of data that is separately transmitted to the macro base station and the at least one small cell; and the receiving a BSR that is sent by the UE according to the indication information includes:

receiving a BSR that is sent by the UE and that is corresponding to a first data buffer size of each logical channel group corresponding to the macro base station; or, receiving a BSR that is sent by the UE and that is corresponding to a first data buffer size of each logical channel group corresponding to the macro base station and/or a BSR that is sent by the UE and that is corresponding to a data buffer size of each logical channel group of the at least one small cell, where the first data buffer size and the data buffer size of each logical channel group of the small cell are determined by the UE according to the traffic distribution ratio information corresponding to each service.

With reference to the second aspect, the first implementation manner of the second aspect, the second implementation manner of the second aspect, the third implementation manner of the second aspect, or the fourth implementation manner of the second aspect, in a sixth implementation manner of the second aspect, the sending indication information to a UE includes:

sending parameter information about a logical channel priority corresponding to each service to the UE, where the parameter information about the logical channel priority is used to indicate the size of data that is separately transmitted to the macro base station and the small cell; and the receiving a BSR that is sent by the UE according to the indication information includes:

receiving a BSR that is sent by the UE and that is corresponding to a first data buffer size of each logical channel group corresponding to the macro base station; or, receiving a BSR that is sent by the UE and that is corresponding to a first data buffer size of each logical channel group corresponding to the macro base station and/or a BSR that is sent by the UE and that is corresponding to a data buffer size of each logical channel group of the at least one small cell, where the first data buffer size and the data buffer size of each logical channel group of the small cell are determined by the UE according to a traffic distribution ratio, and the traffic distribution ratio is determined by the UE according to the parameter information about the logical channel priority corresponding to each service.

With reference to the second aspect, the first implementation manner of the second aspect, the second implementation manner of the second aspect, the third implementation manner of the second aspect, the fourth implementation manner of the second aspect, the fifth implementation manner of the second aspect, or the sixth implementation manner of the second aspect, the BSR further includes:

an LCID or a base station index, where the LCID is used to identify a BSR that needs to be forwarded, and the base station index is used to identify a destination base station to which a BSR needs to be forwarded.

A third aspect of the embodiments of the present invention provides a user equipment, including:

a receiving module, configured to receive indication information that is sent by a macro base station and that is used to request a user equipment UE to send a buffer status report; and a processing module, configured to send a buffer status report BSR to the macro base station and/or at least one small cell according to the indication information, where the macro base station and the at least one small cell jointly serve the UE, and a service area of the macro base station is larger than a service area of each small cell of the at least one small cell.

In a first implementation manner of the third aspect, the indication information includes information that indicates a size of data separately transmitted to the macro base station and the at least one small cell in each service.

With reference to the first implementation manner of the third aspect, in a second implementation manner of the third aspect, the indication information further includes: information that is sent by the macro base station and that is used to indicate a receiving base station of the BSR, where the receiving base station of the BSR includes the macro base station and/or the at least one small cell.

In a third implementation manner of the third aspect, the receiving module is further configured to receive update information that is sent by the macro base station or the small cell and that is used for substituting for a receiving base station of the BSR; and the processing module is further configured to send the BSR to a substitute receiving base station, where the substitute receiving base station includes a macro base station and/or at least one small cell.

With reference to the third aspect, the first implementation manner of the third aspect, the second implementation manner of the third aspect, or the third implementation manner of the third aspect, in a fourth implementation manner of the third aspect, the indication information or the update information includes:

Radio Resource Control signaling RRC signaling, a broadcast message, Media Access Control layer MAC control signaling, or physical layer control signaling.

With reference to the third aspect, the first implementation manner of the third aspect, the second implementation manner of the third aspect, the third implementation manner of the third aspect, or the fourth implementation manner of the third aspect, in a fifth implementation manner of the third aspect, the receiving module is specifically configured to receive traffic distribution ratio information, sent by the macro base station, of each service, where the traffic distribution ratio information is used to indicate the size of data that is separately transmitted to the macro base station and the at least one small cell; and the processing module includes a first determining unit and a first sending unit, where the first determining unit is configured to determine, according to the traffic distribution ratio information of each service, a first data buffer size of each logical channel group corresponding to the macro base station and/or a data buffer size of each logical channel group corresponding to the at least one small cell; and the first sending unit is configured to send, to the macro base station, a BSR corresponding to the first data buffer size and/or send, to the at least one small cell, a BSR corresponding to the data buffer size of each logical channel group corresponding to the small cell; or, send, to the macro base station, a BSR corresponding to the first data buffer size and/or a BSR corresponding to the data buffer size of each logical channel group of the at least one small cell; or, send, to the at least one small cell, a BSR corresponding to the first data buffer size and/or a BSR corresponding to the data buffer size of each logical channel group of the at least one small cell.

With reference to the fifth implementation manner of the third aspect, the first determining unit is specifically configured to obtain the first data buffer size through calculation by using $$\sum_{i=0}^{N} Bi * Mi,$$

and obtain the at least one data buffer size through calculation by using $$\sum_{i=0}^{N} Bi * Si,$$

where

Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service.

With reference to the third aspect, the first implementation manner of the third aspect, the second implementation manner of the third aspect, the third implementation manner of the third aspect, or the fourth implementation manner of the third aspect, in a sixth implementation manner of the third aspect, the receiving module is specifically configured to receive parameter information, sent by the macro base station, about a logical channel priority corresponding to each service, where the parameter information about the logical channel priority is used to indicate the size of data that is separately transmitted to the macro base station and the at least one small cell; and the processing module includes a second determining unit and a second sending unit, where the second determining unit is configured to determine a traffic distribution ratio according to the parameter information about the logical channel priority, and determine, according to the traffic distribution ratio, a first data buffer size of each logical channel group corresponding to the macro base station and/or a data buffer size of each logical channel group corresponding to the at least one small cell; and the second sending unit is configured to send, to the macro base station, a BSR corresponding to the first data buffer size and/or send, to the at least one small cell, a BSR corresponding to the data buffer size of each logical channel group corresponding to the small cell; or, send, to the macro base station, a BSR corresponding to the first data buffer size and/or a BSR corresponding to the data buffer size of each logical channel group of the at least one small cell; or, send, to the at least one small cell, a BSR corresponding to the first data buffer size and/or a BSR corresponding to the data buffer size of each logical channel group of the at least one small cell.

With reference to the sixth implementation manner of the third aspect, the second determining unit is specifically configured to obtain the first data buffer size through calculation by using $$\sum_{i=0}^{N} Bi * \frac{PBRmi * BSDmi}{PBRmi * BSDmi + PBRsi * BSDsi},$$

and obtain the at least one data buffer size through calculation by using $$\sum_{i=0}^{N} Bi * \frac{PBRsi * BSDsi}{PBRmi * BSDmi + PBRsi * BSDsi},$$

where

PBRmi and BSDmi are, respectively, a prioritized bit rate and a bucket size duration, in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, N is a quantity of services in the logical channel group LCG, and Bi is a current data buffer size corresponding to each service.

With reference to the third aspect, the first implementation manner of the third aspect, the second implementation manner of the third aspect, the third implementation manner of the third aspect, the fourth implementation manner of the third aspect, the fifth implementation manner of the third aspect, or the sixth implementation manner of the third aspect, the BSR further includes:

an LCID or a base station index, where the LCID is used to identify a BSR that needs to be forwarded, and the base station index is used to identify a destination base station to which a BSR needs to be forwarded.

A fourth aspect of the embodiments of the present invention provides a base station, including:

a sending module, configured to send a user equipment indication information that is used to request the UE to send a buffer status report; and a receiving module, configured to receive a buffer status report BSR that is sent by the UE according to the indication information, where the macro base station and at least one small cell jointly serve the UE, and a service area of the macro base station is larger than a service area of each small cell of the at least one small cell.

In a first implementation manner of the fourth aspect, the indication information includes information that indicates a size of data separately transmitted to the macro base station and the at least one small cell in each service.

With reference to the first implementation manner of the fourth aspect, in a second implementation manner of the fourth aspect, the indication information further includes:

information that indicates a receiving base station of the BSR, where the receiving base station of the BSR includes the macro base station and/or the at least one small cell.

In a third implementation manner of the fourth aspect, the sending module is further configured to send, to the UE, update information that is used for substituting for a receiving base station of the BSR, where a substitute receiving base station includes a macro base station and/or at least one small cell.

With reference to the fourth aspect, the first implementation manner of the fourth aspect, the second implementation manner of the fourth aspect, or the third implementation manner of the fourth aspect, in a fourth implementation manner of the fourth aspect, the indication information or the update information includes:

Radio Resource Control RRC signaling, a broadcast message, Media Access Control layer MAC control signaling, or physical layer control signaling.

With reference to the fourth aspect, the first implementation manner of the fourth aspect, the second implementation manner of the fourth aspect, the third implementation manner of the fourth aspect, or the fourth implementation manner of the fourth aspect, in a fifth implementation manner of the fourth aspect, the sending module is specifically configured to send traffic distribution ratio information corresponding to each service to the user equipment UE, where the traffic distribution ratio information is used to indicate the size of data that is separately transmitted to the macro base station and the at least one small cell; and the receiving module is specifically configured to receive a BSR that is sent by the UE and that is corresponding to a first data buffer size; or, receive a BSR that is sent by the UE and that is corresponding to a first data buffer size and/or a BSR that is sent by the UE and that is corresponding to a data buffer size of each logical channel group of the at least one small cell, where the first data buffer size and the data buffer size of each logical channel group of the small cell are determined by the UE according to the traffic distribution ratio information corresponding to each service.

In a sixth implementation manner of the fourth aspect, the sending module is specifically configured to send parameter information about a logical channel priority corresponding to each service to the user equipment UE, where the parameter information about the logical channel priority is used to indicate a size of data separately transmitted to the macro base station and the small cell; and the receiving module is specifically configured to receive a BSR that is sent by the UE and that is corresponding to a first data buffer size; or, receive a BSR that is sent by the UE and that is corresponding to a first data buffer size and/or a BSR that is sent by the UE and that is corresponding to a data buffer size of each logical channel group of the at least one small cell, where the first data buffer size and the data buffer size of each logical channel group of the small cell are determined by the UE according to a traffic distribution ratio, and the traffic distribution ratio is determined by the UE according to the parameter information about the logical channel priority corresponding to each service.

With reference to the fourth aspect, the first implementation manner of the fourth aspect, the second implementation manner of the fourth aspect, the third implementation manner of the fourth aspect, the fourth implementation manner of the fourth aspect, the fifth implementation manner of the fourth aspect, or the sixth implementation manner of the fourth aspect, the BSR further includes:

an LCID or a base station index, where the LCID is used to identify a BSR that needs to be forwarded, and the base station index is used to identify a destination base station to which a BSR needs to be forwarded.

In the method for sending and receiving a buffer status report, the user equipment, and the base station provided in the embodiments of the present invention, a macro base station sends indication information to the UE, and the UE sends a buffer status report BSR to the macro base station and/or at least one small cell according to the indication information, so that the small cell and the macro base station can accurately learn the buffer status reports reported by the UE in a scenario in which the small cell and the macro base station jointly bear transmission of a same data service of a user, and therefore, the small cell and the macro base station can perform scheduling in a timely manner.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figures 1, 2:
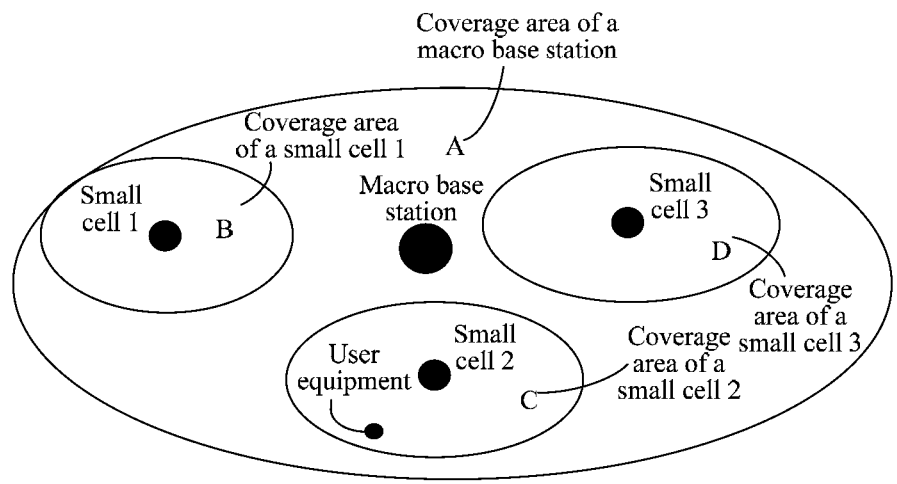
FIG. 1 is a diagram of an application scenario of a macro base station and small cells according to the present invention.
FIG. 2 is a flowchart of Embodiment 1 of a method for sending a buffer status report according to the present invention.

FIG. 1 is a diagram of an application scenario of a macro base station and small cells according to the present invention. As shown in FIG. 1, there are three small cells, one macro base station, and a user equipment. An area A is a coverage area of the macro base station, and an area B, an area C, and an area D are coverage areas of a small cell 1, a small cell 2, and a small cell 3, respectively. In this scenario, the small cells and the macro base station jointly bear transmission of a same data service of the user equipment, and the user equipment needs to send uplink data to the small cells and the macro base station separately. The following introduces in detail how the small cells and the macro base station accurately learn buffer status reports reported by the UE.

FIG. 2 is a flowchart of Embodiment 1 of a method for sending a buffer status report according to the present invention. As shown in FIG. 2, the method of this embodiment may include:

Step 101: Receive indication information that is sent by a macro base station and that is used to request a user equipment UE to send a buffer status report.

Step 102: Send a buffer status report BSR to the macro base station and/or at least one small cell according to the indication information, where the macro base station and the at least one small cell jointly serve the UE, and a service area of the macro base station is larger than a service area of each small cell of the at least one small cell.

In step 101, the indication information includes information that indicates a size of data separately transmitted to the macro base station and the at least one small cell in each service, and the indication information further includes information that is sent by the macro base station and that is used to indicate a receiving base station of the BSR. After receiving the indication information, the UE sends a BSR to the receiving base station according to the receiving base station, indicated by the indication information, of the BSR. In addition, after receiving the indication information sent by the macro base station, the UE may further receive update information that is sent by the macro base station or the small cell and that is used for substituting for the receiving base station of the BSR. After receiving the update information, the UE sends a BSR to these base stations according to a substitute receiving base station, indicated by the update information, of the BSR. The indication information or the update information may be one type of Radio Resource Control signaling RRC signaling, a broadcast message, Media Access Control layer MAC control signaling, and physical layer control signaling, and the indication information and the update information may be a piece of RRC signaling, a broadcast message, a piece of MAC control signaling, or a piece of physical layer control signaling.

In step 101 of this embodiment, the UE receives the indication information sent by the macro base station, where the indication information includes the information that indicates the size of data that is separately transmitted to the macro base station and the at least one small cell in each service. There are two implementation solutions in this embodiment, and as one implementable manner:

The UE receives traffic distribution ratio information, sent by the macro base station, of each service, where the traffic distribution ratio information is used to indicate the size of data that is separately transmitted to the macro base station and the at least one small cell. After receiving the traffic distribution ratio information, the UE determines, according to the traffic distribution ratio information of each service, a first data buffer size of each logical channel group corresponding to the macro base station and/or a data buffer size of each logical channel group corresponding to the at least one small cell. Specifically, the first data buffer size is obtained through calculation by using $$\sum_{i=0}^{N} Bi * Mi,$$

and the data buffer size of each logical channel group corresponding to the at least one small cell is obtained through calculation by using $$\sum_{i=0}^{N} Bi * Si,$$

where Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service. If there are multiple small cells, Si of each small cell may be unique, and during calculation, the data buffer size is calculated according to Si of each small cell.

Then, the UE sends, to the macro base station, a BSR corresponding to the first data buffer size and/or sends, to the at least one small cell, a BSR corresponding to the data buffer size of each logical channel group corresponding to the small cell, or, sends, to the macro base station, a BSR corresponding to the first data buffer size and/or a BSR corresponding to the data buffer size of each logical channel group of the at least one small cell, or, sends, to the at least one small cell, a BSR corresponding to the first data buffer size and/or a BSR corresponding to the data buffer size of each logical channel group of the at least one small cell. In this case, if the UE sends, to the macro base station, the BSR corresponding to the first data buffer size and/or the BSR corresponding to the data buffer size of each logical channel group of the at least one small cell, after receiving the BSRs or the BSR, the macro base station may forward the BSR corresponding to the data buffer size of each logical channel group of the at least one small cell to the corresponding small cell; and if the UE sends, to the at least one small cell, the BSR corresponding to the first data buffer size and/or the BSR corresponding to the data buffer size of each logical channel group of the at least one small cell, after receiving the BSRs or the BSR, the small cell may forward the BSR corresponding to the first data buffer size to the macro base station, and forward a BSR corresponding to a data buffer size of each logical channel group corresponding to another small cell to each corresponding small cell. The BSR further includes an LCID or a base station index, where the LCID is used to identify a BSR that needs to be forwarded, and the base station index is used to identify a destination base station to which a BSR needs to be forwarded. When a BSR needs to be forwarded from the macro base station to the small cell or forwarded from the small cell to the macro base station, the UE needs to use a new LCID to identify the BSR, to distinguish from an LCID corresponding to an original BSR. After receiving the BSR carrying the new LCID identifier, the macro base station or the small cell needs to forward the BSR to the corresponding macro base station or small cell. In addition, there is another method, in which a new identifier, such as a base station index (index), is added to an existing BSR structure, to identify a destination base station to which a BSR needs to be forwarded. BSR information sent at a time may carry multiple pieces of BSR information that need to be forwarded, which are separately identified by using indexes of destination base stations to which BSRs need to be forwarded. When a macro base station or a small cell receives a BSR carrying the base station index, the macro base station or the small cell needs to forward the BSR to the corresponding macro base station or another small cell, where the base station index is configured by the macro base station.

It should be noted that, time when the UE triggers a BSR of the macro base station and that of the at least one small cell may be different, and time when the UE sends a BSR to the macro base station and the at least one small cell may also be different. If the UE needs to send a BSR to the corresponding macro base station or the at least one small cell separately, when the UE needs to send a BSR corresponding to the macro base station, the UE only needs to calculate the first data buffer size of each logical channel group corresponding to the macro base station, and sends a BSR corresponding to the first data buffer size to the macro base station; and when the UE needs to send a BSR of a small cell, the UE only needs to calculate a data buffer size of each logical channel group corresponding to the small cell, and sends a BSR corresponding to the data buffer size to the small cell. If the UE needs to send BSRs or a BSR corresponding to the macro base station and/or the at least one small cell to one site of the macro base station and the at least one small cell in a centralized manner, when the UE needs to send BSRs or a BSR triggered by the macro base station and/or the at least one small cell to the macro base station or a small cell, the UE needs to calculate a data buffer size corresponding to each logical channel group corresponding to the macro base station and/or the at least one small cell that trigger the BSRs/triggers the BSR, and sends, to the macro base station or the small cell, the BSRs or the BSR of the macro base station and/or the at least one small cell that trigger the BSRs/triggers the BSR. Herein, BSRs corresponding to multiple sites may be sent in a combined manner, or may be sent separately.

In the method for sending a buffer status report provided in this embodiment, a UE receives traffic distribution ratio information, sent by a macro base station, of each service; and according to the traffic distribution ratio information of each service, obtains a first data buffer size through calculation by using $$\sum_{i=0}^{N} Bi * Mi,$$

and obtains a data buffer size of each logical channel group corresponding to at least one small cell through calculation by using $$\sum_{i=0}^{N} Bi * Si,$$

where Si or each small cell herein may be unique; and then, the UE sends, to the macro base station, a BSR corresponding to the first data buffer size and/or sends, to the at least one small cell, a BSR corresponding to the data buffer size of each logical channel group corresponding to the small cell, or, sends, to the macro base station, a BSR corresponding to the first data buffer size and/or a BSR corresponding to the data buffer size of each logical channel group of the at least one small cell, or, sends, to the at least one small cell, a BSR corresponding to the first data buffer size and/or a BSR corresponding to the data buffer size of each logical channel group of the at least one small cell, so that the UE can accurately learn, according to the traffic distribution ratio information of each service, the buffer status report reported by the UE, and therefore the small cell and the macro base station can perform scheduling in a timely manner.

As another implementable manner the UE receives parameter information, sent by the macro base station, about a logical channel priority corresponding to each service, where the parameter information about the logical channel priority is used to indicate the size of data that is separately transmitted to the macro base station and the at least one small cell; after receiving the parameter information about the logical channel priority corresponding to each service, the UE determines a traffic distribution ratio according to the parameter information about the logical channel priority, and determines, according to the traffic distribution ratio, a first data buffer size of each logical channel group corresponding to the macro base station and/or a data buffer size of each logical channel group corresponding to the at least one small cell. Specifically, the first data buffer size is obtained through calculation by using $$\sum_{i=0}^{N} Bi * \frac{PBRmi * BSDmi}{PBRmi * BSDmi + PBRsi * BSDsi},$$

and the data buffer size of each logical channel group corresponding to the at least one small cell is obtained through calculation by using $$\sum_{i=0}^{N} Bi * \frac{PBRsi * BSDsi}{PBRmi * BSDmi + PBRsi * BSDsi},$$

where PBRmi and BSDmi are, respectively, a prioritized bit rate (Prioritised Bit Rate, PBR for short) and a bucket size duration (Bucket Size Duration, BSD for short), in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, where if there are multiple small cells, PBRsi and BSDsi corresponding to each small cell may be unique, N is a quantity of services in a logical channel group LCG, and Bi is a current data buffer size corresponding to each service.

Then, the UE sends, to the macro base station, a BSR corresponding to the first data buffer size and/or sends, to the at least one small cell, a BSR corresponding to the data buffer size of each logical channel group corresponding to the small cell, or, sends, to the macro base station, a BSR corresponding to the first data buffer size and/or a BSR corresponding to the data buffer size of each logical channel group of the at least one small cell, or, sends, to the at least one small cell, a BSR corresponding to the first data buffer size and/or a BSR corresponding to the data buffer size of each logical channel group of the at least one small cell. In this case, if the UE sends, to the macro base station, the BSR corresponding to the first data buffer size and/or the BSR corresponding to the data buffer size of each logical channel group of the at least one small cell, after receiving the BSRs or the BSR, the macro base station may forward the BSR corresponding to the data buffer size of each logical channel group of the at least one small cell to the small cell; and if the UE sends, to the at least one small cell, the BSR corresponding to the first data buffer size and the BSR corresponding to the data buffer size of each logical channel group of the at least one small cell, after receiving the BSRs, the small cell may forward the BSR corresponding to the first data buffer size of each logical channel group corresponding to the macro base station to the macro base station.

In the method for sending a buffer status report provided in this embodiment, a UE receives parameter information, sent by a macro base station, about a logical channel priority corresponding to each service, and according to the parameter information about the logical channel priority, obtains a first data buffer size through calculation by using $$\sum_{i=0}^{N} Bi * \frac{PBRmi*BSDmi}{PBRmi*BSDmi+PBRsi*BSDsi},$$

and obtains a data buffer size of each logical channel group corresponding to at least one small cell through calculation by using $$\sum_{i=0}^{N} Bi * \frac{PBRsi*BSDsi}{PBRmi*BSDmi+PBRsi*BSDsi};$$

and then, the UE sends, to the macro base station, a BSR corresponding to the first data buffer size and/or sends, to the at least one small cell, a BSR corresponding to the data buffer size of each logical channel group corresponding to the small cell, or, sends, to the macro base station, a BSR corresponding to the first data buffer size and/or a BSR corresponding to the data buffer size of each logical channel group of the at least one small cell, or, sends, to the at least one small cell, a BSR corresponding to the first data buffer size and/or a BSR corresponding to the data buffer size of each logical channel group of the at least one small cell, so that the UE can accurately learn, according to the parameter information about the logical channel priority corresponding to each service, the buffer status report reported by the UE, and therefore the small cell and the macro base station can perform scheduling in a timely manner.

Figure 3:
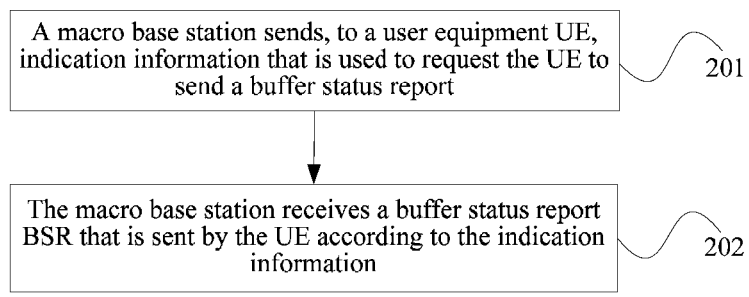
FIG. 3 is a flowchart of Embodiment 1 of a method for receiving a buffer status report according to the present invention.

FIG. 3 is a flowchart of Embodiment 1 of a method for receiving a buffer status report according to the present invention. As shown in FIG. 3, the method of this embodiment may include:

Step 201: A macro base station sends, to a user equipment UE, indication information that is used to request the UE to send a buffer status report.

Step 202: The macro base station receives a buffer status report BSR that is sent by the UE according to the indication information, where the macro base station and at least one small cell jointly serve the UE, and a service area of the macro base station is larger than a service area of each small cell of the at least one small cell.

In step 201, the indication information sent by the macro base station to the user equipment UE includes information that indicates a size of data separately transmitted to the macro base station and the at least one small cell in each service. The indication information further includes information that indicates a receiving base station of the BSR, where the receiving base station of the BSR includes the macro base station and/or the at least one small cell. After the macro base station sends the indication information to the user equipment UE, the method may further include: sending, to the UE, update information that is used for substituting for the receiving base station of the BSR, where a substitute receiving base station includes a macro base station and/or at least one small cell. The indication information or the update information may be one type of RRC signaling, a broadcast message, MAC control signaling, and physical layer control signaling, and the indication information and the update information may also be a piece of RRC signaling, a broadcast message, a piece of MAC control signaling, or a piece of physical layer control signaling.

In step 201 in this embodiment, the macro base station sends the indication information to the user equipment UE. There are two implementation solutions in this embodiment, and as one implementable manner the macro base station sends traffic distribution ratio information corresponding to each service to the UE, where the traffic distribution ratio information is used to indicate the size of data that is separately transmitted to the macro base station and the at least one small cell. It should be noted that, the macro base station configures the traffic distribution ratio information of each service for the UE, and the macro base station may configure traffic distribution ratio information of multiple services at a time, or may configure traffic distribution ratio information of one service at a time and perform configuration for several times. Then, the macro base station receives a BSR that is sent by the UE and that is corresponding to a first data buffer size of each logical channel group corresponding to the macro base station, or, receives a BSR that is sent by the UE and that is corresponding to a first data buffer size of each logical channel group corresponding to the macro base station and/or a BSR that is sent by the UE and that is corresponding to a data buffer size of each logical channel group of the at least one small cell. In this case, if the macro base station receives the BSR that is sent by the UE and that is corresponding to the first data buffer size of each logical channel group corresponding to the macro base station and/or the BSR corresponding to the data buffer size of each logical channel group of the at least one small cell, the macro base station may forward the BSR corresponding to the data buffer size of each logical channel group of the at least one small cell to the small cell. The first data buffer size and the data buffer size of each logical channel group of the small cell are determined by the UE according to the traffic distribution ratio information corresponding to each service. The BSR further includes an LCID or a base station index, where the LCID is used to identify a BSR that needs to be forwarded, and the base station index is used to identify a destination base station to which a BSR needs to be forwarded.

In the method for receiving a buffer status report provided in this embodiment, a macro base station sends traffic distribution ratio information corresponding to each service to a UE; and then, the macro base station receives a BSR that is sent by the UE and that is corresponding to a first data buffer size of each logical channel group corresponding to the macro base station or receives a BSR that is sent by the UE and that is corresponding to a first data buffer size of each logical channel group corresponding to the macro base station and/or a BSR that is sent by the UE and that is corresponding to a data buffer size of each logical channel group of at least one small cell, where the first data buffer size and the data buffer size of each logical channel group of the small cell are determined by the UE according to the traffic distribution ratio information corresponding to each service, so that the small cell and the macro base station can accurately learn the buffer status reports reported by the UE, and therefore the small cell and the macro base station can perform scheduling in a timely manner.

As another implementable manner the macro base station sends parameter information about a logical channel priority corresponding to each service to the UE, where the parameter information about the logical channel priority is used to indicate the size of data that is separately transmitted to the macro base station and the small cell, and then, the macro base station receives a BSR that is sent by the UE and that is corresponding to a first data buffer size of each logical channel group corresponding to the macro base station, or, receives a BSR that is sent by the UE and that is corresponding to a first data buffer size of each logical channel group corresponding to the macro base station and/or a BSR that is sent by the UE and that is corresponding to a data buffer size of each logical channel group of the at least one small cell, where the first data buffer size is determined by the UE according to a traffic distribution ratio, and the traffic distribution ratio is determined by the UE according to the parameter information about the logical channel priority corresponding to each service.

In the method for receiving a buffer status report provided in this embodiment, a macro base station sends parameter information about a logical channel priority corresponding to each service to a UE, and then, the macro base station receives a BSR that is sent by the UE and that is corresponding to a first data buffer size of each logical channel group corresponding to the macro base station or receives a BSR that is sent by the UE and that is corresponding to a first data buffer size of each logical channel group corresponding to the macro base station and/or a BSR that is sent by the UE and that is corresponding to a data buffer size of each logical channel group of at least one small cell, where the first data buffer size is determined by the UE according to a traffic distribution ratio, and the traffic distribution ratio is determined by the UE according to the parameter information about the logical channel priority corresponding to each service, so that the small cell and the macro base station can accurately learn the buffer status reports reported by the UE, and therefore the small cell and the macro base station can perform scheduling in a timely manner.

Several specific embodiments are used in the following to describe in detail the technical solutions of the method embodiments shown in FIG. 2 and FIG. 3.

Figure 4:
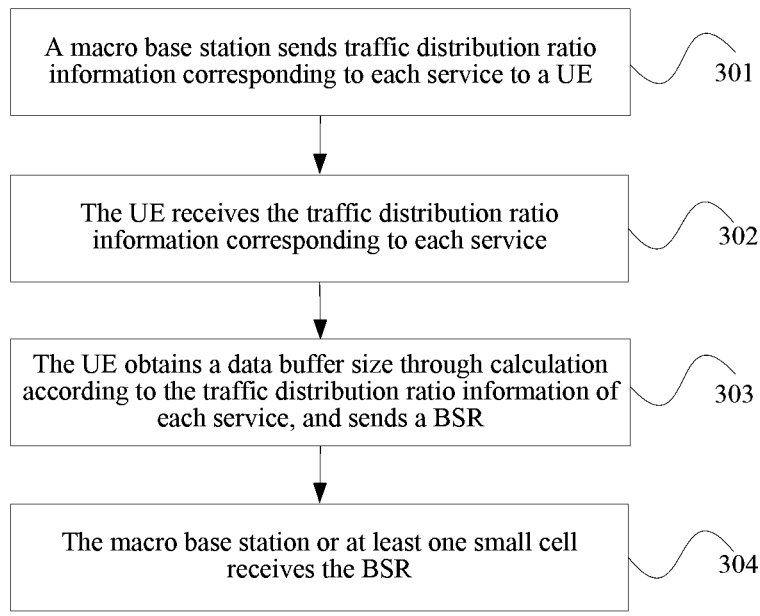
FIG. 4 is a flowchart of Embodiment 1 of a method for sending and receiving a buffer status report according to the present invention.

FIG. 4 is a flowchart of Embodiment 1 of a method for sending and receiving a buffer status report according to the present invention. As shown in FIG. 4, the method may include:

Step 301: A macro base station sends traffic distribution ratio information corresponding to each service to a UE, where the traffic distribution ratio information is used to indicate a size of data separately transmitted to the macro base station and at least one small cell.

Step 302: The UE receives the traffic distribution ratio information corresponding to each service.

Step 303: After the UE receives the traffic distribution ratio information, the UE determines, according to the traffic distribution ratio information of each service, a first data buffer size of each logical channel group corresponding to the macro base station and/or a data buffer size of each logical channel group corresponding to the at least one small cell. Specifically, the first data buffer size is obtained through calculation by using $$\sum_{i=0}^{N} Bi * Mi,$$

and the data buffer size of each logical channel group corresponding to the at least one small cell is obtained through calculation by using $$\sum_{i=0}^{N} Bi * Si,$$

where Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service. Then, the UE sends, to the macro base station, a BSR corresponding to the first data buffer size and/or sends, to the at least one small cell, a BSR corresponding to the data buffer size of each logical channel group corresponding to the small cell, or, sends, to the macro base station, a BSR corresponding to the first data buffer size and/or a BSR corresponding to the data buffer size of each logical channel group of the at least one small cell, or, sends, to the at least one small cell, a BSR corresponding to the first data buffer size and/or a BSR corresponding to the data buffer size of each logical channel group of the at least one small cell.

Step 304: The macro base station or the small cell receives the BSR that is sent by the UE and that is corresponding to the first data buffer size of each logical channel group corresponding to the macro base station, or receives the BSR that is sent by the UE and that is corresponding to the first data buffer size of each logical channel group corresponding to the macro base station and/or the BSR corresponding to the data buffer size of each logical channel group of the at least one small cell. The BSR further includes an LCID or a base station index, where the LCID is used to identify a BSR that needs to be forwarded, and the base station index is used to identify a destination base station to which a BSR needs to be forwarded. The base station index is configured by the macro base station, and the macro base station or the small cell forwards, to the corresponding macro base station or small cell, the received BSR that needs to be forwarded.

In the method for sending and receiving a buffer status report provided in this embodiment, a macro base station sends traffic distribution ratio information corresponding to each service to a UE, and the UE receives the traffic distribution ratio information corresponding to each service. After the UE receives the traffic distribution ratio information, the UE obtains a data buffer size through calculation, and sends a BSR corresponding to the data buffer size to the macro base station or a small cell. Finally, the macro base station or the small cell receives the BSR that is sent by the UE and that is corresponding to the data buffer size, so that the UE can accurately learn, according to the traffic distribution ratio information of each service, the buffer status report to be reported by the UE, and therefore the small cell and the macro base station can perform scheduling in a timely manner.

Figure 5:
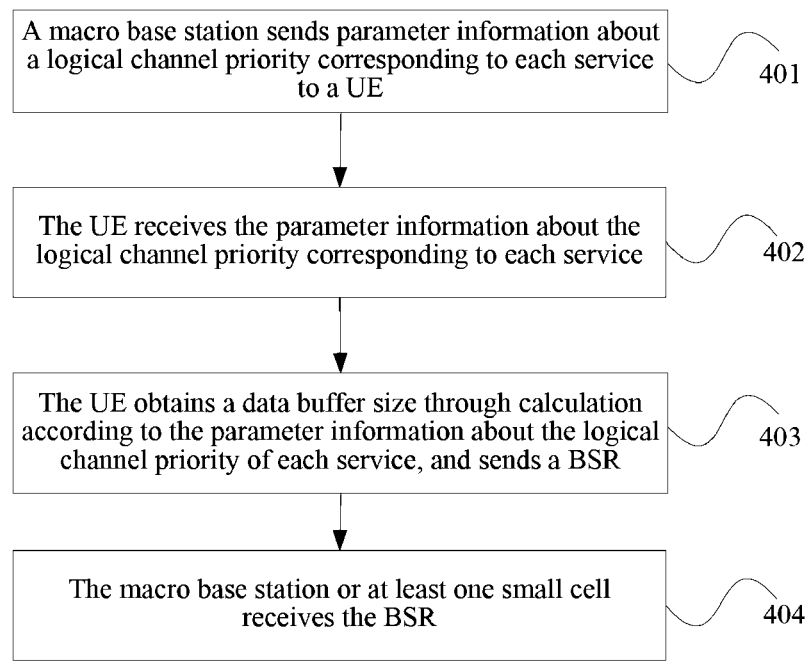
FIG. 5 is a flowchart of Embodiment 2 of a method for sending and receiving a buffer status report according to the present invention.

FIG. 5 is a flowchart of Embodiment 2 of a method for sending and receiving a buffer status report according to the present invention. As shown in FIG. 5, the method may include:

Step 401: A macro base station sends parameter information about a logical channel priority corresponding to each service to a UE, where the parameter information about the logical channel priority is used to indicate a size of data separately transmitted to the macro base station and a small cell.

Step 402: The UE receives the parameter information about the logical channel priority corresponding to each service.

Step 403: After the UE receives the parameter information about the logical channel priority, the UE determines a traffic distribution ratio according to the parameter information about the logical channel priority, and determines, according to the traffic distribution ratio, a first data buffer size of each logical channel group corresponding to the macro base station and a data buffer size of each logical channel group corresponding to at least one small cell. Specifically, the first data buffer size is obtained through calculation by using $$\sum_{i=0}^{N} Bi * \frac{PBRmi*BSDmi}{PBRmi*BSDmi + PBRsi*BSDsi},$$

and the data buffer size of each logical channel group corresponding to the at least one small cell is obtained through calculation by using $$\sum_{i=0}^{N} Bi * \frac{PBRmi*BSDmi}{PBRmi*BSDmi + PBRsi*BSDsi},$$

where PBRmi and BSDmi are, respectively, a prioritized bit rate and a bucket size duration, in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, N is a quantity of services in a logical channel group LCG, and Bi is a current data buffer size corresponding to each service. Then, the UE sends, to the macro base station, a BSR corresponding to the first data buffer size and sends, to the at least one small cell, a BSR corresponding to the data buffer size of each logical channel group corresponding to the small cell, or, sends, to the macro base station, a BSR corresponding to the first data buffer size and/or a BSR corresponding to the data buffer size of each logical channel group of the at least one small cell, or, sends, to the at least one small cell, a BSR corresponding to the first data buffer size and a BSR corresponding to the data buffer size of each logical channel group of the at least one small cell.

Step 404: The macro base station or the small cell receives the BSR that is sent by the UE and that is corresponding to the first data buffer size of each logical channel group corresponding to the macro base station, or receives the BSR that is sent by the UE and that is corresponding to the first data buffer size of each logical channel group corresponding to the macro base station and the BSR that is sent by the UE and that is corresponding to the data buffer size of each logical channel group of the at least one small cell. The BSR further includes an LCID or a base station index, where the LCID is used to identify a BSR that needs to be forwarded, and the base station index is used to identify a destination base station to which a BSR needs to be forwarded. The base station index is configured by the macro base station, and the macro base station or the small cell forwards, to the corresponding macro base station or small cell, the received BSR that needs to be forwarded.

In the method for sending and receiving a buffer status report provided in this embodiment, a macro base station sends parameter information about a logical channel priority corresponding to each service to a UE, and the UE receives the parameter information about the logical channel priority corresponding to each service. After receiving the parameter information about the logical channel priority, the UE obtains a data buffer size through calculation, and sends a BSR corresponding to the data buffer size to the macro base station or a small cell. Finally, the macro base station or the small cell receives the BSR that is sent by the UE and that is corresponding to the data buffer size, so that the UE can accurately learn, according to the parameter information about the logical channel priority of each service, the buffer status report to be reported by the UE, and therefore the small cell and the macro base station can perform scheduling in a timely manner.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Figure 6:
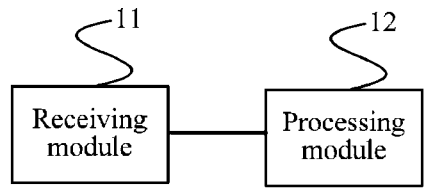
FIG. 6 is a schematic structural diagram of Embodiment 1 of a user equipment according to the present invention.

FIG. 6 is a schematic structural diagram of Embodiment 1 of a user equipment according to the present invention. As shown in FIG. 6, an apparatus of this embodiment may include: a receiving module 11 and a processing module 12.

The receiving module 11 is configured to receive indication information that is sent by a macro base station and that is used to request the user equipment UE to send a buffer status report, where the indication information includes information that indicates a size of data separately transmitted to the macro base station and at least one small cell in each service. The indication information further includes information that is sent by the macro base station and that is used to indicate a receiving base station of the BSR, and the receiving module 11 is further configured to receive update information that is sent by the macro base station or the small cell and that is used for substituting for the receiving base station of the BSR, where a substitute receiving base station includes a macro base station and/or at least one small cell.

The processing module 12 is configured to send a buffer status report BSR to the macro base station and/or the at least one small cell according to the indication information, where the macro base station and the at least one small cell jointly serve the UE, and a service area of the macro base station is larger than a service area of each small cell of the at least one small cell. The processing module 12 is specifically configured to send the BSR to the receiving base station indicated in the indication information; and the processing module 12 is further configured to send the BSR to the substitute receiving base station, where the substitute receiving base station includes a macro base station and/or at least one small cell. The indication information or the update information includes: RRC signaling, a broadcast message, MAC control signaling, or physical layer control signaling. The BSR further includes an LCID or a base station index, where the LCID is used to identify a BSR that needs to be forwarded, and the base station index is used to identify a destination base station to which a BSR needs to be forwarded. The base station index is configured by the macro base station.

Figure 7:
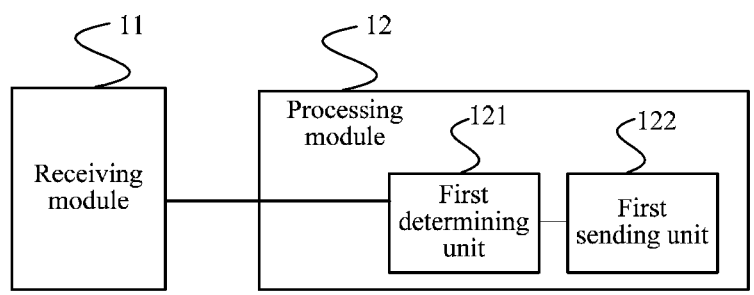
FIG. 7 is a schematic structural diagram of Embodiment 2 of a user equipment according to the present invention.

FIG. 7 is a schematic structural diagram of Embodiment 2 of a user equipment according to the present invention. As shown in FIG. 7, an apparatus in this embodiment is based on the structure of the apparatus shown in FIG. 6. Further, the receiving module 11 is specifically configured to receive traffic distribution ratio information, sent by the macro base station, of each service, where the traffic distribution ratio information is used to indicate the size of data that is separately transmitted to the macro base station and the at least one small cell. The processing module 12 may further include: a first determining unit 121 and a first sending unit 122, where the first determining unit 121 is configured to determine, according to the traffic distribution ratio information of each service, a first data buffer size of each logical channel group corresponding to the macro base station and/or a data buffer size of each logical channel group corresponding to the at least one small cell. The first determining unit 121 is specifically configured to obtain the first data buffer size through calculation by using $$\sum_{i=0}^{N} Bi * Mi,$$

and obtain at least one data buffer size through calculation by using $$\sum_{i=0}^{N} Bi * Si,$$

where Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service.

The first sending unit 122 is configured to send, to the macro base station, a BSR corresponding to the first data buffer size and/or send, to the at least one small cell, a BSR corresponding to the data buffer size of each logical channel group corresponding to the small cell; or, send, to the macro base station, a BSR corresponding to the first data buffer size and/or a BSR corresponding to the data buffer size of each logical channel group of the at least one small cell, or, send, to the at least one small cell, a BSR corresponding to the first data buffer size and/or a BSR corresponding to the data buffer size of each logical channel group of the at least one small cell.

Figure 8:
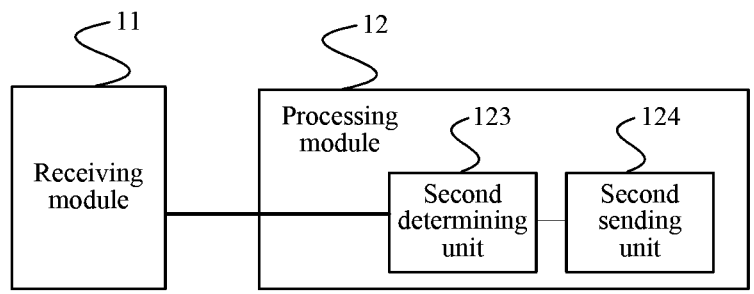
FIG. 8 is a schematic structural diagram of Embodiment 3 of a user equipment according to the present invention.

FIG. 8 is a schematic structural diagram of Embodiment 3 of a user equipment according to the present invention. As shown in FIG. 8, an apparatus in this embodiment is based on the structure of the apparatus shown in FIG. 6. Further, the receiving module 11 is specifically configured to receive parameter information, sent by the macro base station, about a logical channel priority corresponding to each service, where the parameter information about the logical channel priority is used to indicate the size of data that is separately transmitted to the macro base station and the at least one small cell. The processing module 12 may further include: a second determining unit 123 and a second sending unit 124, where the second determining unit 123 is configured to determine a traffic distribution ratio according to the parameter information about the logical channel priority, and determine, according to the traffic distribution ratio, a first data buffer size of each logical channel group corresponding to the macro base station and/or a data buffer size of each logical channel group corresponding to the at least one small cell. The second determining unit 123 is specifically configured to obtain the first data buffer size through calculation by using $$\sum_{i=0}^{N} Bi * \frac{PBRmi * BSDmi}{PBRmi * BSDmi + PBRsi * BSDsi},$$

and obtain the data buffer size of each logical channel group corresponding to the at least one small cell through calculation by using $$\sum_{i=0}^{N} Bi * \frac{PBRsi * BSDsi}{PBRmi * BSDmi + PBRsi * BSDsi},$$

where PBRmi and BSDmi are, respectively, a prioritized bit rate and a bucket size duration, in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, N is a quantity of services in a logical channel group LCG, and Bi is a data buffer size corresponding to each service.

The second sending unit 124 is configured to send, to the macro base station, a BSR corresponding to the first data buffer size and/or send, to the at least one small cell, a BSR corresponding to the data buffer size of each logical channel group corresponding to the small cell; or, send, to the macro base station, a BSR corresponding to the first data buffer size and/or a BSR corresponding to the data buffer size of each logical channel group of the at least one small cell, or, send, to the at least one small cell, a BSR corresponding to the first data buffer size and/or a BSR corresponding to the data buffer size of each logical channel group of the at least one small cell.

The user equipments shown in FIG. 6, FIG. 7, and FIG. 8 may be configured to execute the technical solutions of the method embodiment shown in FIG. 2, implementation principles and technical effects thereof are similar, and details are not described herein again.

Figure 9:
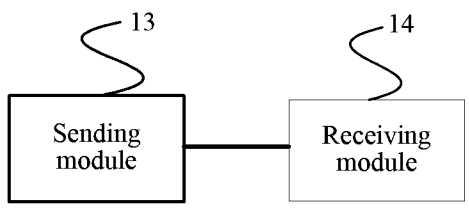
FIG. 9 is a schematic structural diagram of Embodiment 1 of a base station according to the present invention.

FIG. 9 is a schematic structural diagram of Embodiment 1 of a base station according to the present invention. As shown in FIG. 9, the base station in this embodiment may include: a sending module 13 and a receiving module 14.

The sending module 13 is configured to send, to a user equipment UE, indication information that is used to request the UE to send a buffer status report, where the indication information includes information that indicates a size of data separately transmitted to a macro base station and at least one small cell in each service. The indication information further includes information that indicates a receiving base station of the BSR, where the receiving base station of the BSR includes the macro base station and/or the at least one small cell. The sending module 13 is further configured to send, to the UE, update information that is used for substituting for the receiving base station of the BSR, where a substitute receiving base station includes a macro base station and/or at least one small cell.

The sending module 13 is specifically configured to send traffic distribution ratio information corresponding to each service to the user equipment UE, where the traffic distribution ratio information is used to indicate the size of data that is separately transmitted to the macro base station and the at least one small cell. The sending module 13 is specifically configured to send parameter information about a logical channel priority corresponding to each service to the user equipment UE, where the parameter information about the logical channel priority is used to indicate the size of data that is separately transmitted to the macro base station and the small cell.

The receiving module 14 is configured to receive a buffer status report BSR that is sent by the UE according to the indication information, where the macro base station and the at least one small cell jointly serve the UE, and a service area of the macro base station is larger than a service area of each small cell of the at least one small cell. The indication information or the update information includes: RRC signaling, a broadcast message, MAC control signaling, or physical layer control signaling. The BSR further includes an LCID or a base station index, where the LCID is used to identify a BSR that needs to be forwarded, and the base station index is used to identify a destination base station to which a BSR needs to be forwarded. The base station index is configured by the macro base station. The receiving module 14 is specifically configured to receive a BSR that is sent by the UE and that is corresponding to a first data buffer size of each logical channel group corresponding to the macro base station; or, receive a BSR that is sent by the UE and that is corresponding to a first data buffer size of each logical channel group corresponding to the macro base station and/or a BSR that is sent by the UE and that is corresponding to a data buffer size of each logical channel group of the at least one small cell. The first data buffer size and the data buffer size of each logical channel group of the small cell are determined by the UE according to the traffic distribution ratio information corresponding to each service.

The receiving module 14 is specifically configured to receive a BSR that is sent by the UE and that is corresponding to a first data buffer size of each logical channel group corresponding to the macro base station, or, receive a BSR that is sent by the UE and that is corresponding to a first data buffer size of each logical channel group corresponding to the macro base station and/or a BSR that is sent by the UE and that is corresponding to a data buffer size of each logical channel group of the at least one small cell. The first data buffer size and the data buffer size of each logical channel group of the small cell are determined by the UE according to a traffic distribution ratio, and the traffic distribution ratio is determined by the UE according to the parameter information about the logical channel priority corresponding to each service.

The base station in this embodiment may be configured to execute the technical solutions of the method embodiment shown in FIG. 3, implementation principles and technical effects thereof are similar, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A method for sending a buffer status report, comprising:
   receiving indication information that is sent by a macro base station and that is used to request a user equipment (UE) to send a buffer status report; wherein the indication information comprises information that indicates a size of data separately transmitted to the macro base station and at least one small cell in each service; and
   sending a buffer status report (BSR) to the macro base station or the at least one small cell according to the indication information, wherein the macro base station and the at least one small cell jointly serve the UE, and a service area of the macro base station is larger than a service area of each small cell of the at least one small cell.

2. The method according to claim 1, wherein the receiving indication information sent by a macro base station comprises:
   receiving traffic distribution ratio information, sent by the macro base station, of each service, wherein the traffic distribution ratio information indicates the size of data that is separately transmitted to the macro base station and the at least one small cell; and
   the sending a buffer status report to the macro base station or at the least one small cell according to the indication information comprises:
   determining, according to the traffic distribution ratio information of each service, a first data buffer size of each logical channel group corresponding to the macro base station or a data buffer size of each logical channel group corresponding to the at least one small cell; and sending, to the macro base station, a BSR corresponding to the first data buffer size or sending, to the at least one small cell, a BSR corresponding to the data buffer size of each logical channel group corresponding to the small cell; or, sending, to the macro base station, a BSR corresponding to the first data buffer size or a BSR corresponding to the data buffer size of each logical channel group of the at least one small cell; or, sending, to the at least one small cell, a BSR corresponding to the first data buffer size or a BSR corresponding to the data buffer size of each logical channel group of the at least one small cell.

3. The method according to claim 2, wherein the determining, according to the traffic distribution ratio information, a first data buffer size of each logical channel group corresponding to the macro base station or a data buffer size of each logical channel group corresponding to the at least one small cell comprises:

obtaining the first data buffer size through calculation using $$\sum_{i=0}^{N} Bi * Mi,$$

and obtaining the data buffer size of each logical channel group corresponding to the at least one small cell through calculation using $$\sum_{i=0}^{N} Bi * Si,$$

wherein
Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service.

4. The method according to claim 1, wherein the receiving indication information sent by a macro base station comprises:

receiving parameter information, sent by the macro base station, about a logical channel priority corresponding to each service, wherein the parameter information about the logical channel priority indicates the size of data that is separately transmitted to the macro base station and the at least one small cell; and the sending a buffer status report to the macro base station or the at least one small cell according to the indication information comprises:

determining a traffic distribution ratio according to the parameter information about the logical channel priority, and determining, according to the traffic distribution ratio, a first data buffer size of each logical channel group corresponding to the macro base station or a data buffer size of each logical channel group corresponding to the at least one small cell; and sending, to the macro base station, a BSR corresponding to the first data buffer size or sending, to the at least one small cell, a BSR corresponding to the data buffer size of each logical channel group corresponding to the small cell; or, sending, to the macro base station, a BSR corresponding to the first data buffer size or a BSR corresponding to the data buffer size of each logical channel group of the at least one small cell; or, sending, to the at least one small cell, a BSR corresponding to the first data buffer size or a BSR corresponding to the data buffer size of each logical channel group of the at least one small cell.

5. The method according to claim 4, wherein the determining a traffic distribution ratio according to the parameter information about the logical channel priority, and determining, according to the traffic distribution ratio, a first data buffer size of each logical channel group corresponding to the macro base station or a data buffer size of each logical channel group corresponding to the at least one small cell comprises:

obtaining the first data buffer size through calculation using $$\sum_{i=0}^{N} Bi * \frac{PBRmi * BSDmi}{PBRmi * BSDmi + PBRsi * BSDsi},$$

and obtaining the data buffer size of each logical channel group corresponding to the at least one small cell through calculation using $$\sum_{i=0}^{N} Bi * \frac{PBRsi * BSDsi}{PBRmi * BSDmi + PBRsi * BSDsi},$$

wherein
PBRmi and BSDmi are, respectively, a prioritized bit rate and a bucket size duration, in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, N is a quantity of services in the logical channel group LCG, and Bi is a current data buffer size corresponding to each service.

6. A method for receiving a buffer status report, comprising:

sending, by a macro base station to a user equipment (UE), indication information that is used to request the UE to send a buffer status report; wherein the indication information comprises information that indicates a size of data separately transmitted to the macro base station and at least one small cell in each service; and receiving, by the macro base station, a buffer status report (BSR) that is sent by the UE according to the indication information, wherein the macro base station and at least one small cell jointly serve the UE, and a service area of the macro base station is larger than a service area of each small cell of the at least one small cell.

7. The method according to claim 6, wherein the sending indication information to a UE comprises:

sending traffic distribution ratio information corresponding to each service to the UE, wherein the traffic distribution ratio information indicates the size of data that is separately transmitted to the macro base station and the at least one small cell; and the receiving a BSR that is sent by the UE according to the indication information comprises:

receiving a BSR that is sent by the UE and that is corresponding to a first data buffer size of each logical channel group corresponding to the macro base station; or, receiving a BSR that is sent by the UE and that is corresponding to a first data buffer size of each logical channel group corresponding to the macro base station or a BSR that is sent by the UE and that is corresponding to a data buffer size of each logical channel group of the at least one small cell, wherein the first data buffer size and the data buffer size of each logical channel group of the small cell are determined by the UE according to the traffic distribution ratio information corresponding to each service.

8. The method according to claim 6, wherein the sending indication information to a UE comprises:

sending parameter information about a logical channel priority corresponding to each service to the UE, wherein the parameter information about the logical channel priority indicate the size of data that is separately transmitted to the macro base station and the small cell; and the receiving a BSR that is sent by the UE according to the indication information comprises:

receiving a BSR that is sent by the UE and that is corresponding to a first data buffer size of each logical channel group corresponding to the macro base station; or, receiving a BSR that is sent by the UE and that is corresponding to a first data buffer size of each logical channel group corresponding to the macro base station or a BSR that is sent by the UE and that is corresponding to a data buffer size of each logical channel group of the at least one small cell, wherein the first data buffer size and the data buffer size of each logical channel group of the small cell are determined by the UE according to a traffic distribution ratio, and the traffic distribution ratio is determined by the UE according to the parameter information about the logical channel priority corresponding to each service.

9. A user equipment (UE), comprising a transmitter and a receiver, wherein:

the receiver is configured to receive indication information that is sent by a macro base station and that is used to request the UE to send a buffer status report; wherein the indication information comprises information that indicates a size of data separately transmitted to the macro base station and at least one small cell in each service; and the transmitter is configured to send a buffer status report (BSR) to the macro base station or at least one small cell according to the indication information, wherein the macro base station and the at least one small cell jointly serve the UE, and a service area of the macro base station is larger than a service area of each small cell of the at least one small cell.

10. The user equipment according to claim 9, wherein the receiver is configured to receive traffic distribution ratio information, sent by the macro base station, of each service, wherein the traffic distribution ratio information indicates the size of data that is separately transmitted to the macro base station and the at least one small cell; and the UE further comprising a processor configured to determine, according to the traffic distribution ratio information of each service, a first data buffer size of each logical channel group corresponding to the macro base station or a data buffer size of each logical channel group corresponding to the at least one small cell; and the transmitter is configured to send, to the macro base station, a BSR corresponding to the first data buffer size or send, to the at least one small cell, a BSR corresponding to the data buffer size of each logical channel group corresponding to the small cell; or, send, to the macro base station, a BSR corresponding to the first data buffer size or a BSR corresponding to the data buffer size of each logical channel group of the at least one small cell; or, send, to the at least one small cell, a BSR corresponding to the first data buffer size or a BSR corresponding to the data buffer size of each logical channel group of the at least one small cell.

11. The user equipment according to claim 10, wherein the processor is configured to obtain the first data buffer size through calculation using $$\sum_{i=0}^{N} Bi * Mi,$$

and obtain the data buffer size of each logical channel group corresponding to the at least one small cell through calculation using $$\sum_{i=0}^{N} Bi * Si,$$

wherein

Mi is a data transmission ratio, in the traffic distribution ratio information, corresponding to the macro base station, Si is a data transmission ratio, in the traffic distribution ratio information, corresponding to the small cell, N is a quantity of services in a logical channel group LCG, and Bi is a current data buffer size corresponding to each service.

12. The user equipment according to claim 9, wherein the receiver is configured to receive parameter information, sent by the macro base station, about a logical channel priority corresponding to each service, wherein the parameter information about the logical channel priority indicates the size of data that is separately transmitted to the macro base station and the at least one small cell; and the processor is configured to determine a traffic distribution ratio according to the parameter information about the logical channel priority, and determine, according to the traffic distribution ratio, a first data buffer size of each logical channel group corresponding to the macro base station or a data buffer size of each logical channel group corresponding to the at least one small cell; and the transmitter is configured to send, to the macro base station, a BSR corresponding to the first data buffer size or send, to the at least one small cell, a BSR corresponding to the data buffer size of each logical channel group corresponding to the small cell; or, send, to the macro base station, a BSR corresponding to the first data buffer size or a BSR corresponding to the data buffer size of each logical channel group of the at least one small cell; or, send, to the at least one small cell, a BSR corresponding to the first data buffer size or a BSR corresponding to the data buffer size of each logical channel group of the at least one small cell.

13. The user equipment according to claim 12, wherein the processor is configured to obtain the first data buffer size through calculation using $$\sum_{i=0}^{N} Bi * \frac{PBRmi * BSDmi}{PBRmi * BSDmi + PBRsi * BSDsi},$$

and obtain the data buffer size of each logical channel group corresponding to the at least one small cell through calculation using $$\sum_{i=0}^{N} Bi * \frac{PBRsi * BSDsi}{PBRmi * BSDmi + PBRsi * BSDsi},$$

wherein

PBRmi and BSDmi are, respectively, a prioritized bit rate and a bucket size duration, in the parameter information about the logical channel priority, of transmission from the UE to the macro base station, PBRsi and BSDsi are, respectively, a prioritized bit rate and a bucket size duration, in the parameter information about the logical channel priority, of transmission from the UE to the small cell, N is a quantity of services in the logical channel group LCG, and Bi is a current data buffer size corresponding to each service.

14. A base station, comprising:
a transmitter, configured to send a user equipment (UE) indication information that is used to request the UE to send a buffer status report (BSR); wherein the indication information comprises information that indicates a size of data separately transmitted to the macro base station and at least one small cell in each service; and
a receiver, configured to receive the BSR that is sent by the UE according to the indication information, wherein a macro base station and the at least one small cell jointly serve the UE, and a service area of the macro base station is larger than a service area of each small cell of the at least one small cell.

15. The base station according to claim 14, wherein the transmitter is configured to send traffic distribution ratio information corresponding to each service to the user equipment UE, wherein the traffic distribution ratio information indicates the size of data that is separately transmitted to the macro base station and the at least one small cell; and
the receiver is configured to receive a BSR that is sent by the UE and that is corresponding to a first data buffer size of each logical channel group corresponding to the macro base station; or,
receive a BSR that is sent by the UE and that is corresponding to a first data buffer size of each logical channel group corresponding to the macro base station or a BSR that is sent by the UE and that is corresponding to a data buffer size of each logical channel group of the at least one small cell, wherein the first data buffer size and the data buffer size of each logical channel group of the small cell are determined by the UE according to the traffic distribution ratio information corresponding to each service.

16. The base station according to claim 14, wherein the transmitter is configured to send parameter information about a logical channel priority corresponding to each service to the UE, wherein the parameter information about the logical channel priority indicates a size of data separately transmitted to the macro base station and the small cell; and
the receiver is configured to receive a BSR that is sent by the UE and that is corresponding to a first data buffer size of each logical channel group corresponding to the macro base station; or,
receive a BSR that is sent by the UE and that is corresponding to a first data buffer size of each logical channel group corresponding to the macro base station or a BSR that is sent by the UE and that is corresponding to a data buffer size of each logical channel group of the at least one small cell, wherein the first data buffer size and the data buffer size of each logical channel group of the small cell are determined by the UE according to a traffic distribution ratio, and the traffic distribution ratio is determined by the UE according to the parameter information about the logical channel priority corresponding to each service.

* * * * *